US009306240B2

United States Patent
Lee et al.

(10) Patent No.: US 9,306,240 B2
(45) Date of Patent: Apr. 5, 2016

(54) SOLID POLYMERIC ELECTROLYTES AND LITHIUM BATTERY INCLUDING THE SAME

(71) Applicant: ELECTRONICS AND TELECOMMUNICATIONS RESEARCH INSTITUTE, Daejeon (KR)

(72) Inventors: Young-Gi Lee, Daejeon (KR); Kwang Man Kim, Daejeon (KR); Dong Ok Shin, Daejeon (KR); Kunyoung Kang, Daejeon (KR); Sang-Young Lee, Chuncheon-si (KR); Eun-Hye Kil, Namyangju-si (KR); Keunho Choi, Gangneung-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/690,215

(22) Filed: Apr. 17, 2015

(65) Prior Publication Data

US 2015/0221981 A1    Aug. 6, 2015

Related U.S. Application Data

(62) Division of application No. 13/712,528, filed on Dec. 12, 2012, now Pat. No. 9,034,522.

(30) Foreign Application Priority Data

Jun. 15, 2012   (KR) .................. 10-2012-0064232

(51) Int. Cl.
  *H01M 6/18*   (2006.01)
  *H01M 10/0565*   (2010.01)
  (Continued)

(52) U.S. Cl.
  CPC ........ *H01M 10/0565* (2013.01); *H01M 10/052* (2013.01); *H01M 10/056* (2013.01);
  (Continued)

(58) Field of Classification Search
  CPC ... H01M 6/18; H01M 6/187; H01M 10/0565; H01M 2300/0065
  See application file for complete search history.

(56) References Cited

U.S. PATENT DOCUMENTS 5,436,091 A * 7/1995 Shackle et al. ............. 429/304
6,156,458 A * 12/2000 Brodd et al. ................ 429/317
(Continued)

FOREIGN PATENT DOCUMENTS

| KR | 10-0273506 B1 | 9/2000 |
| KR | 10-0278539 B1 | 10/2000 |

(Continued)

OTHER PUBLICATIONS

Weili Li et al., "A composite microporous gel polymer electrolyte prepared by ultra-violet cross-linking", European Polymer Journal, Feb. 2007, pp. 522-528, vol. 43, Issue 2.

(Continued)

*Primary Examiner* — Stewart Fraser
*Assistant Examiner* — Olatunji Godo
(74) *Attorney, Agent, or Firm* — Rabin & Berdo, P.C.

(57) ABSTRACT

A solid polymeric electrolyte having a pattern, and a lithium battery including the same, includes a polymer matrix having a mesh structure and being formed of a cured photo-crosslinking agent; inorganic particles substantially uniformly distributed in the polymer matrix; and a liquid electrolyte comprised of a lithium salt and an organic solvent impregnated between the polymer matrix and the inorganic particles. The liquid electrolyte and the cured photo-crosslinking agent are present in a weight ratio ranging from 50:50 to 99:1. The liquid electrolyte containing the cured photo-crosslinking agent and the inorganic particle are present in a weight ratio ranging from 10:90 to 90:10. The solid polymeric electrolyte has properties suitable for a printing process to provide the pattern including a thickness ranging from about 10 nm to about 500 μm and, prior to curing the photo-crosslinking agent, a viscosity ranging from 100-10, 000 poise under a shear rate condition of 1 sec$^{-1}$.

9 Claims, 15 Drawing Sheets

(51) Int. Cl.
   *H01M 10/056* (2010.01)
   *H01M 10/052* (2010.01)

(52) U.S. Cl.
   CPC ............ *H01M2300/0025* (2013.01); *H01M 2300/0082* (2013.01); *H01M 2300/0091* (2013.01); *Y02E 60/122* (2013.01)

(56) References Cited

U.S. PATENT DOCUMENTS

2007/0226990 A1   10/2007   Morimoto
2010/0238608 A1   9/2010    Dreissig et al.
2012/0315547 A1*  12/2012   Itoh et al. .................. 429/312

FOREIGN PATENT DOCUMENTS

| KR | 10-0374499 B1 | 2/2003 |
| KR | 10-0527322 B1 | 11/2005 |
| KR | 10-0760276 B1 | 9/2007 |
| WO | WO 2011099497 | * 8/2011 |

OTHER PUBLICATIONS

Zhaohui Li et al., "Micro-porous P(VDF-HFP)-based polymer electrolyte filled with Al2O3 nanoparticles", Solid State Ionics, Jul. 2005, pp. 1903-1908, vol. 176, Issues 23-24.

Shanshan Wang et al., "Solid polymer electrolytes of blends of polyurethane and polyether modified polysiloxane and their ionic conductivity", Polymer, May 2010, vol. 51, Issue 12.

J. R. Nair et al., "UV-cured methacrylic membranes as novel gel-polymer electrolyte for Li-ion batteries", Journal of Power Sources, Apr. 1, 2008, pp. 751-757, vol. 178, Issue 2.

C. Gerbaldi et al., "UV-curable siloxane-acrylate gel-copolymer electrolytes for lithium-based battery application", Electrochimica Acta, Jan. 25, 2010, pp. 1460-1467, vol. 55, Issue 4.

* cited by examiner

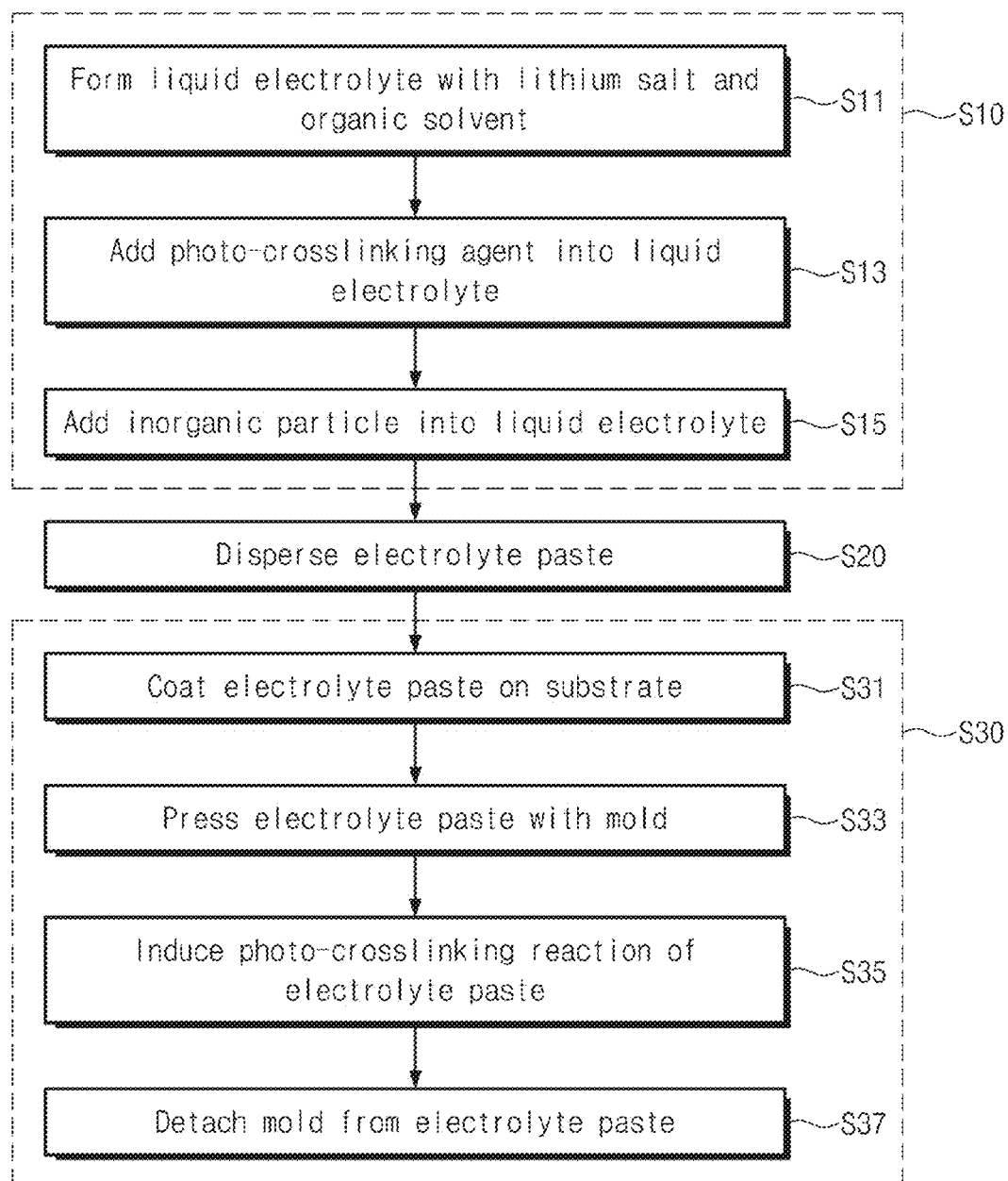

SOLID POLYMERIC ELECTROLYTES AND LITHIUM BATTERY INCLUDING THE SAME

CROSS-REFERENCE TO RELATED APPLICATIONS

This is a divisional of co-pending U.S. application Ser. No. 13/712,528, filed Dec. 12, 2012, which claims priority under 35 U.S.C. §119 to Korean Patent Application No. 10-2012-0064232, filed on Jun. 15, 2012, in the Korean Intellectual Property Office, the entire contents of which are hereby incorporated by reference.

BACKGROUND OF THE INVENTION

Exemplary embodiments of the inventive concept relate to solid polymeric electrolytes, methods of fabricating the same, and lithium battery including the same.

As energy storing and conversion technology becomes increasingly important, there is increasing interest in the lithium battery. In general, the lithium battery includes an anode, a separator, a cathode, and an electrolyte. The electrolyte is interposed between the anode and the cathode, thereby serving as a medium that allows ions to be transferred.

Conventionally, the lithium battery is provided in the form of a two-dimensional structure. Recently, as design of a product becomes increasingly important, there is a need to diversify a structure of the lithium battery. However, due to high fluidity of the organic liquid electrolyte, there is a difficulty in diversifying the design of the lithium battery.

SUMMARY

Exemplary embodiments of the inventive concept provide a solid polymeric electrolyte to be used for a lithium battery and a method of fabricating a patterned solid polymeric electrolyte.

Other exemplary embodiments of the inventive concept provide a method of fabricating a solid polymeric electrolyte, and in particular, a method of controlling fluidity of the electrolyte paste.

According to exemplary embodiments of the inventive concepts, a solid polymeric electrolyte may include a polymer matrix having a mesh structure, the polymer matrix being formed of a cured photo-crosslinking agent, inorganic particles distributed in the polymer matrix, and a lithium salt and an organic solvent impregnated between the polymer matrix and the inorganic particles. The solid polymeric electrolyte may include a first portion, a second portion, and a third portion connecting the first and second portions, and one of the first, second, and third portions may be located apart from a flat plane connecting the others.

In exemplary embodiments, the photo-crosslinking agent may include at least one of polyethyleneglycol diacrylate, triethyleneglycol diacrylate, trimethylolpropaneethoxylate triacrylate, and Bisphenol A ethoxylate dimethacrylate.

In exemplary embodiments, the solid polymeric electrolyte has a thickness ranging from about 10 nm to about 500 μm.

In exemplary embodiments, the inorganic particles include at least one of silicon dioxide ($SiO_2$), aluminum oxide ($Al_2O_3$), titanium dioxide ($TiO_2$), titanium barium oxide ($BaTiO_3$), lithium oxide ($Li_2O$), lithium fluoride (LiF), lithium hydroxide (LiOH), lithium nitride ($Li_3N$), barium oxide (BaO), sodium oxide ($Na_2O$), lithium carbonate ($Li_2CO_3$), calcium carbonate ($CaCO_3$), lithium aluminate ($LiAlO_2$), titanium strontium oxide ($SrTiO_3$), tin oxide ($SnO_2$), cerium oxide ($CeO_2$), magnesium oxide (MgO), nickel oxide (NiO), calcium oxide (CaO), zinc oxide (ZnO), zinc peroxide ($ZrO_2$), and silicon carbide (SiC).

In exemplary embodiments, a mean diameter of the inorganic particles ranges from about 1 nm to about 10 μm.

In exemplary embodiments, the lithium salt may include at least one of lithium hexafluorophosphate ($LiPF_6$), lithium tetrafluoroborate ($LiBF_4$), lithium hexafluoroantimonate ($LiSbF_6$), lithium hexafluoroarsenate ($LiAsF_6$), lithium difluoromethanesulfonate ($LiC_4F_9SO_3$), lithium perchlorate ($LiClO_4$), lithium aluminate ($LiAlO_2$), lithium tetrachloroaluminate ($LiAlCl_4$), lithium chloride (LiCl), lithium iodide (LiI), lithium bis(oxalato)borate ($LiB(C_2O_4)_2$), lithium trifluoromethanesulfonyl imide ($LiN(C_xF_{2x+1}SO_2)(C_yF_{2y+1}SO_2)$) (where x and y may be natural numbers), and the organic solvent may include at least one of ethylene carbonate, propylene carbonate, g-butylrolactone, and ethylene glycol dimethyl ether.

According to exemplary embodiments of the inventive concepts, a method of fabricating a solid polymeric electrolyte may include mixing a liquid electrolyte, a photo-crosslinking agent, and an inorganic particle to form an electrolyte paste, dispersing the electrolyte paste, coating the electrolyte paste on a substrate, pressing the electrolyte paste with a patterned mold to copy a shape of the patterned mold onto the electrolyte paste: and illuminating an ultraviolet light onto the electrolyte paste to induce a photo-crosslinking reaction of the electrolyte paste.

In exemplary embodiments, the electrolyte paste may be coated on the substrate to a thickness ranging from 10 nm to 500 μm.

In exemplary embodiments, the forming of the electrolyte paste may be performed in such a way that the liquid electrolyte and the photo-crosslinking agent may be mixed with weight ratio ranging from 50:50 to 99:1.

In exemplary embodiments, the forming of the electrolyte paste may be performed in such a way that the liquid electrolyte containing the photo-crosslinking agent and the inorganic particle may be mixed with weight ratio ranging from 10:90 to 90:10.

In exemplary embodiments, the electrolyte paste has viscosity ranging from 100 to 10,000 poise, under a shear rate condition of 1 $sec^{-1}$.

According to exemplary embodiments of the inventive concepts, a lithium battery may include an anode electrode provided with an anode active material and an anode current collector, a cathode electrode provided with a cathode active material and a cathode current collector and disposed to face the anode electrode, and a solid polymeric electrolyte interposed between the anode and cathode electrodes. The solid polymeric electrolyte may include a cured polymer matrix, inorganic particles dispersed in the solid polymer, and a lithium salt and an organic solvent impregnated between the polymer matrix and the inorganic particles, the solid polymeric electrolyte may include a first portion, a second portion, and a third portion connecting the first and second portions, and one of the first, second, and third portions may be located apart from a flat plane connecting the others.

According to exemplary embodiments of the inventive concepts, the lithium salt may include at least one of lithium hexafluorophosphate ($LiPF_6$), lithium tetrafluoroborate ($LiBF_4$), lithium hexafluoroantimonate ($LiSbF_6$), lithium hexafluoroarsenate ($LiAsF_6$), lithium difluoromethanesulfonate ($LiC_4F_9SO_3$), lithium perchlorate ($LiClO_4$), lithium aluminate ($LiAlO_2$), lithium tetrachloroaluminate ($LiAlCl_4$), lithium chloride (LiCl), lithium iodide (LiI), lithium bis(oxalato)borate ($LiB(C_2O_4)_2$), lithium trifluoromethanesulfonyl imide ($LiN(C_xF_{2x+1}SO_2)(C_yF_{2y+1}SO_2)$ (where x and y may be natural numbers), and the organic solvent may include at least one of ethylene carbonate, propylene carbonate, g-butylrolactone, and ethylene glycol dimethyl ether.

In exemplary embodiments, the photo-crosslinking agent may include at least one of polyethyleneglycol diacrylate, triethyleneglycol diacrylate, trimethylolpropaneethoxylate triacrylate, and Bisphenol A ethoxylate dimethacrylate.

In exemplary embodiments, the inorganic particles include at least one of silicon dioxide ($SiO_2$), aluminum oxide ($Al_2O_3$), titanium dioxide ($TiO_2$), titanium barium oxide ($BaTiO_3$), lithium oxide ($Li_2O$), lithium fluoride (LiF), lithium hydroxide (LiOH), lithium nitride ($Li_3N$), barium oxide (BaO), sodium oxide ($Na_2O$), lithium carbonate ($Li_2CO_3$), calcium carbonate ($CaCO_3$), lithium aluminate ($LiAlO_2$), titanium strontium oxide ($SrTiO_3$), tin oxide ($SnO_2$), cerium oxide ($CeO_2$), magnesium oxide (MgO), nickel oxide (NiO), calcium oxide (CaO), zinc oxide (ZnO), zinc peroxide ($ZrO_2$), and silicon carbide (SiC).

In exemplary embodiments, a mean diameter of the inorganic particles ranges from about 1 nm to about 10 μm.

BRIEF DESCRIPTION OF THE DRAWINGS

Exemplary embodiments will be more clearly understood from the following brief description taken in conjunction with the accompanying drawings. The accompanying drawings represent non-limiting, exemplary embodiments as described herein.

FIG. 3 is a flow chart illustrating a method of fabricating the solid polymeric electrolyte according to exemplary embodiments of the inventive concept.

Figure 1:
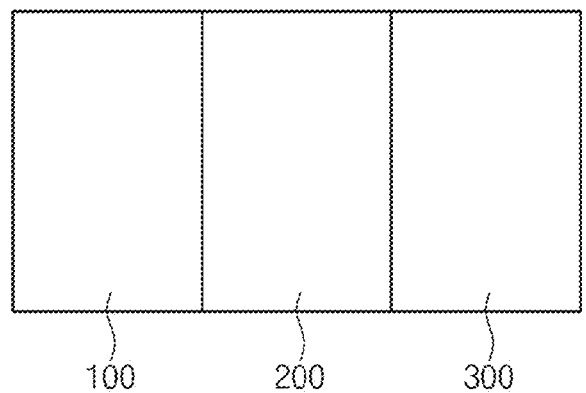
FIG. 1 is a sectional view illustrating a lithium battery according to exemplary embodiments of the inventive concept.

It should be noted that these figures are intended to illustrate the general characteristics of methods, structure and/or materials utilized in certain exemplary embodiments and to supplement the written description provided below. These drawings are not, however, to scale and may not precisely reflect the precise structural or performance characteristics of any given embodiment, and should not be interpreted as defining or limiting the range of values or properties encompassed by exemplary embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Exemplary embodiments of the inventive concepts will now be described more fully with reference to the accompanying drawings, in which exemplary embodiments are shown. Exemplary embodiments of the inventive concepts may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Exemplary embodiments of the inventive concepts are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments of the inventive concepts should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a sectional view illustrating a lithium battery according to exemplary embodiments of the inventive concept.

Referring to FIG. 1, a lithium battery 1 may include a cathode 100 and an anode 300, spaced apart from and facing each other, and a solid polymeric electrolyte 200 between the cathode 100 and the anode 300.

The cathode 100 may include a cathode active material and a cathode current collector. The cathode active material may include a first lithium adsorption material, a first conductive layer, and a polymer binder. For example, the first lithium adsorption material may be formed of lithium manganese oxide, lithium cobalt oxide, lithium nickel oxide, lithium iron oxide and/or any mixture thereof. The first conductive layer may be formed of a carbonaceous material (such as, hard carbon, soft carbon, or graphite). The polymer binder may be formed of polyvinylidene difluoride (PVDF). The cathode current collector may be a metal foil. For example, the cathode current collector may include aluminum, nickel and/or alloys thereof.

The anode 300 may include an anode active material and an anode current collector. The anode active material may include a second lithium adsorption material, a second conductive layer, and a polymer binder. The second lithium adsorption material may include a layer formed of lithium metal, lithium alloys, tin (Sn), silicon (Si), metal oxide, and/or lithium titanium oxide (LTO) etc. For example, the second lithium adsorption material may be formed of lithium titanium oxide. The second conductive layer may be a carbonaceous material. The polymer binder may be formed of polyvinylidene difluoride (PVDF). The anode current collector may be a metal foil. For example, the anode current collector may include copper, gold, nickel and/or alloys thereof.

Figure 2:
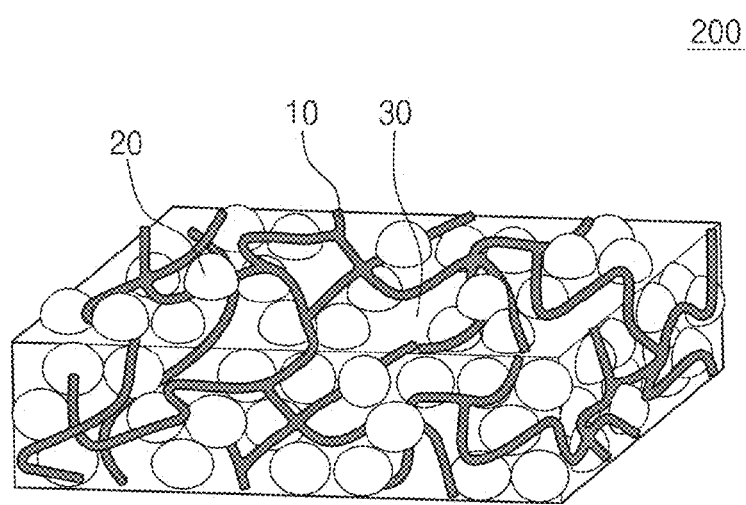
FIG. 2 is a perspective view illustrating a polymer electrolyte according to exemplary embodiments of the inventive concept.

FIG. 2 is a perspective view illustrating a polymer electrolyte according to exemplary embodiments of the inventive concept.

Referring to FIGS. 1 and 2, the solid polymeric electrolyte 200 may include a polymer matrix 10, inorganic particles 20, and a liquid electrolyte 30. A thickness of the solid polymeric electrolyte 200 may range from about 10 nm to about 500 μm.

The polymer matrix 10 may have a three-dimensional continuous mesh structure. The polymer matrix 10 may enable to maintain a shape and a mechanical strength of the solid polymeric electrolyte 200. The polymer matrix 10 may be formed from a photo-crosslinking agent. The photo-crosslinking agent may have at least two crosslinkable functional groups. The polymer matrix 10 may be formed from a photo-polymerization reaction of the functional group of the photo-crosslinking agent. In exemplary embodiments, the photo-crosslinking agent may include acrylate monomers or derivative and/or mixture thereof. For example, the photo-crosslinking agent may include polyethyleneglycol diacrylate, triethyleneglycol diacrylate, trimethylolpropaneethoxylate triacrylate, or Bisphenol A ethoxylate dimethacrylate.

The inorganic particles 20 may be substantially uniformly distributed in the solid polymeric electrolyte 200. Gaps between the inorganic particles 20 may be used as pathways allowing lithium ions to move. The inorganic particles 20 may be substantially uniform in terms of shape and size. A mean diameter of the inorganic particle 20 may range from about 1 nm to about 10 μm. The inorganic particle 20 may be formed of a material having a good affinity for the liquid electrolyte 30 and exhibiting excellent thermal stability to improve thermal stability of the lithium ion battery. For example, the inorganic particle 20 may include at least one of silicon dioxide ($SiO_2$), aluminum oxide ($Al_2O_3$), titanium dioxide ($TiO_2$), titanium barium oxide ($BaTiO_3$), lithium oxide ($Li_2O$), lithium fluoride (LiF), lithium hydroxide (LiOH), lithium nitride ($Li_3N$), barium oxide (BaO), sodium oxide ($Na_2O$), lithium carbonate ($Li_2CO_3$), calcium carbonate ($CaCO_3$), lithium aluminate ($LiAlO_2$), titanium strontium oxide ($SrTiO_3$), tin oxide ($SnO_2$), cerium oxide ($CeO_2$), magnesium oxide (MgO), nickel oxide (NiO), calcium oxide (CaO), zinc oxide (ZnO), zinc peroxide ($ZrO_2$), and silicon carbide (SiC).

The liquid electrolyte 30 may be impregnated in the gaps that are provided between the polymer matrix 10 and the inorganic particles 20. Transportation of ions may be achieved by the liquid electrolyte 30. The liquid electrolyte 30 may include an organic solvent with lithium salt. The organic solvent may be a material having low volatility, low boiling point, and good thermal stability. For example, the organic solvent may include ring-type polycarbonate solvent (e.g., ethylene carbonate, propylene carbonate, and g-butyrolactone), a glyme solvent (e.g., ethylene glycol dimethyl ether), and/or derivatives and/or mixtures thereof.

In exemplary embodiments, the lithium salt may be one of lithium hexafluorophosphate ($LiPF_6$), lithium tetrafluoroborate ($LiBF_4$), lithium hexafluoroantimonate ($LiSbF_6$), lithium hexafluoroarsenate ($LiAsF_6$), lithium difluoromethanesulfonate ($LiC_4F_9SO_3$), lithium perchlorate ($LiClO_4$), lithium aluminate ($LiAlO_2$), lithium tetrachloroaluminate ($LiAlCl_4$), lithium chloride (LiCl), lithium iodide (LiI), lithium bis(oxalato)borate ($LiB(C_2O_4)_2$), lithium trifluoromethanesulfonyl imide ($LiN(C_xF_{2x+1}SO_2)(C_yF_{2y+1}SO_2)$ (where x and y are natural numbers), or derivatives and/or mixtures thereof.

A structure or shape of the solid polymeric electrolyte 200 may be variously modified. According to some aspects of the inventive concept, the solid polymeric electrolyte 200 may include a first portion, a second portion, and a third portion connecting the first and second portions, and one of the first, second, and third portions is located apart from a flat plane connecting the others. In other embodiments, the solid polymeric electrolyte 200 may have a patterned hexahedral structure. In still other exemplary embodiments, the solid polymeric electrolyte 200 may be formed to have an elliptical, spherical, conic, and/or polygonal structure. The solid polymeric electrolyte 200 may be applied to a lithium battery having a three-dimensional structure.

Hereinafter, a method of forming the solid polymeric electrolyte 200 will be described with reference to FIGS. 1 through 3.

FIG. 3 is a flow chart illustrating a method of forming the solid polymeric electrolyte 200 according to exemplary embodiments of the inventive concept.

Referring to FIG. 3, the formation of the solid polymeric electrolyte 200 may include mixing a photo-crosslinking agent, the liquid electrolyte 30, and the inorganic particle 20 to form an electrolyte paste (in S10), dispersing the electrolyte paste (in S20), and forming a pattern on the dispersed electrolyte paste using a printing process (in S30).

The formation of the electrolyte paste (in S10) may include dissolving lithium salt in organic solvent to form the liquid electrolyte 30 (in S11), adding a photo-crosslinking agent into the liquid electrolyte 30 (in S13), and then, adding the inorganic particle 20 into the liquid electrolyte 30 added with the photo-crosslinking agent (in S15).

An agitation process may be performed during the adding of the photo-crosslinking agent into the liquid electrolyte 30 (in S13). A composition ratio between the liquid electrolyte 30 and the photo-crosslinking agent may be controlled. For example, a weight ratio between the liquid electrolyte 30 and the photo-crosslinking agent may range from 50:50 to 99:1. In the case where a content of the photo-crosslinking agent is less than the minimum of the weight ratio range, a content of the polymer matrix 10 in the solid polymeric electrolyte 200 may be reduced, such that the solid polymeric electrolyte 200 may exhibit a deteriorated mechanical strength. By contrast, if the content of the photo-crosslinking agent increases, the content of the liquid electrolyte 30 may decrease. This may lead to deterioration in electrochemistry of the solid polymeric electrolyte 200, because ionic conductivity of the solid polymeric electrolyte 200 may be determined by the liquid electrolyte 30.

The inorganic particles 20 may be added in the liquid electrolyte 30 (in S15). A composition of the inorganic particle 20 in the electrolyte paste may be adjusted. For example, a weight ratio between the liquid electrolyte 30 added with the photo-crosslinking agent and the inorganic particle 20 may range from 10:90 to 90:10. In the case where a content of the inorganic particles 20 is less than the minimum of the weight ratio range, viscosity of the electrolyte paste may be decreased, and thus, during the formation of the pattern, the electrolyte paste may drop down. This means that the pattern may not be normally formed. In the case where the content of the inorganic particles 20 is excessively high, there may be a problem in dispersing the electrolyte paste. Accordingly, the photo-crosslinking agent, the liquid electrolyte, and the inorganic particle 20 may be non-uniformly dispersed in the electrolyte paste.

The dispersion of the electrolyte paste (S20) may be performed in such a way that the inorganic particle 20 may be uniformly dispersed. The dispersion of the electrolyte paste may be performed using a ball milling technique and/or a sonication technique. After the dispersion, the electrolyte paste may have viscosity of 100-10,000 poise under a shear rate condition of 1 $sec^{-1}$.

The forming of the pattern (S30) may include coating the electrolyte paste on a substrate (in S31), pressing the electrolyte paste with a mold to transcribe the shape of the mold onto the electrolyte paste (in S33), illuminating an ultraviolet light onto the electrolyte paste to induce a photo-crosslinking reaction of the electrolyte paste (in S35), and then, detaching the mold from the electrolyte paste (in S37).

Figure 4A:
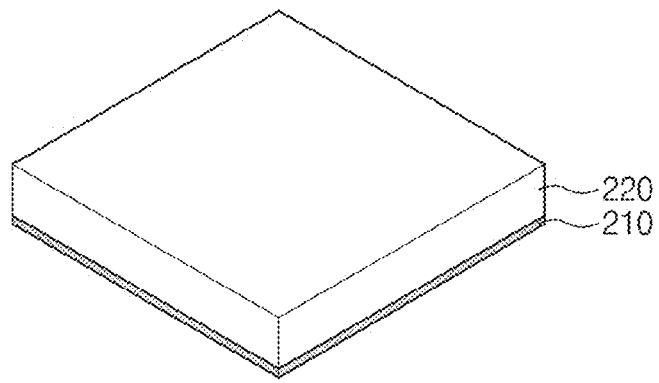
FIGS. 4A through 4E are perspective views illustrating a process of forming a pattern on an electrolyte paste, according to exemplary embodiments of the inventive concept.

Referring to FIGS. 3 and 4A, a dispersed electrolyte paste 220 may be coated on a substrate 210 (in S31). The electrolyte paste 220 may be coated to have a thickness of about 10 nm to 500 μm. If the thickness of the electrolyte paste 220 is thick, the lithium battery 1 may exhibit degraded performance. If the thickness of the electrolyte paste 220 is thin, there is a technical difficulty in controlling processes of forming the electrolyte paste 220 and the solid polymeric electrolyte 200.

Figure 4B:
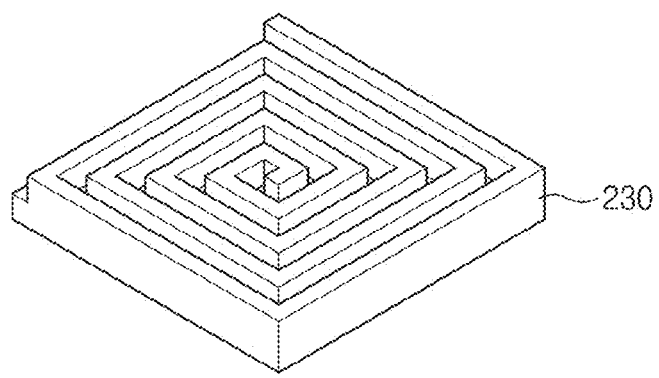

FIG. 4B shows an example of a mold 230 according to exemplary embodiments of the inventive concept. The mold 230 may include polypropylene (PP) and/or polydimethyl siloxane.

Figure 4C:
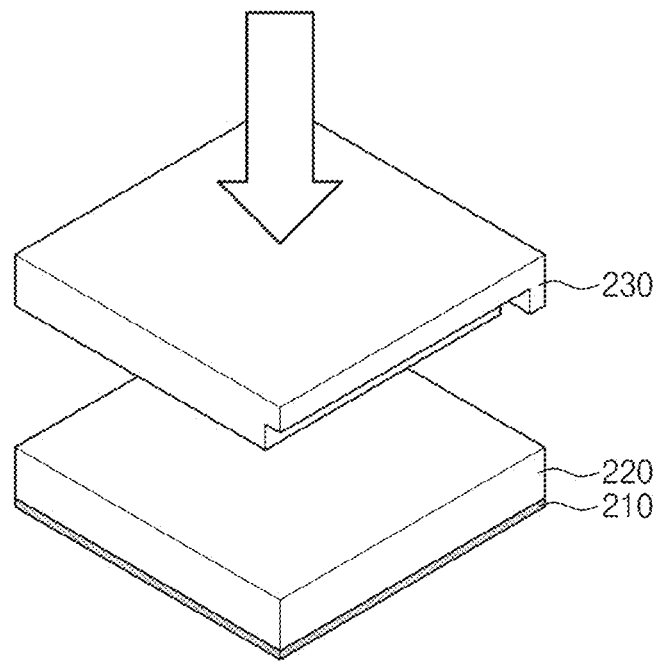

Referring to FIGS. 3 and 4C, the electrolyte paste 220 may be pressured with the mold 230 to transcribe the shape of the mold 230 onto the electrolyte paste 220 (in S33).

Figure 4D:
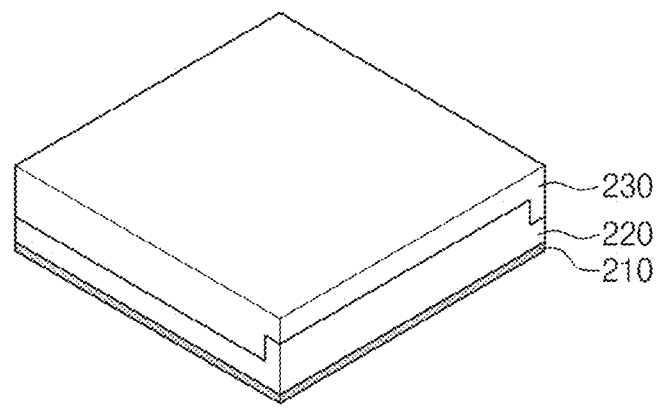

Referring to FIGS. 3 and 4D, a photopolymerization may be performed on the electrolyte paste 220 with the transcribed pattern (in S35). The photopolymerization may include illuminating an ultraviolet light onto the electrolyte paste 220. As a result, the polymer matrix 10 may be formed from the photo-crosslinking agent.

Figure 4E:
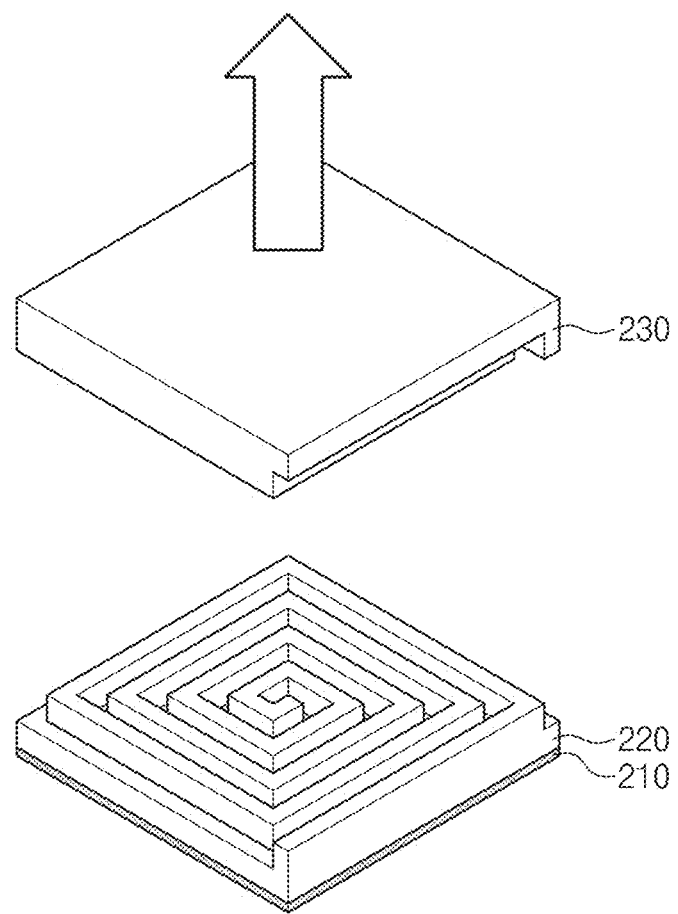

Referring to FIGS. 3 and 4E, the mold 230 may be detached from the solid polymeric electrolyte 200. Accordingly, the solid polymeric electrolyte 200 may be formed to have the pattern.

A shape of the solid polymeric electrolyte 200 may be variously changed depending on the shape of the pattern. According to some aspects of the inventive concept, the solid polymeric electrolyte 200 may include a first portion, a second portion, and a third portion connecting the first and second portions, and one of the first, second, and third portions is located apart from a flat plane connecting the others. In exemplary embodiments, the solid polymeric electrolyte 200 may have a hexahedral shape. Alternatively, the solid polymeric electrolyte 200 may have at least one of spherical, conic, and/or polyhedral shapes.

Hereinafter, a fabrication method of a solid polymeric electrolyte and characteristics of the solid polymeric electrolyte will be described in more detail with reference to an experimental example.

Fabrication of Solid Polymeric Electrolyte

Experimental Example 1

Lithium hexafluorophosphate ($LiPF_6$) was dissolved in an organic solvent to form 1 mole of a liquid electrolyte 30. The organic solvent was prepared to include ethylene carbonate (EC) and propylene carbonate (PC) mixed with a volume ratio of 1:1. A photo-crosslinking agent was added into the liquid electrolyte 30 and was agitated for 20 min at room temperature. The photo-crosslinking agent was trimethylolpropane ethoxylate triacrylate. A weight ratio of the liquid electrolyte 30 to photo-crosslinking agent was 85:15. Inorganic particles 20 of $Al_2O_3$ having a mean diameter of 300 nm were added into the liquid electrolyte 30 with the photo-crosslinking agent to form an electrolyte paste. A weight ratio of the liquid electrolyte 30 with the photo-crosslinking agent to the inorganic particle 20 was 1:2. The electrolyte paste was dispersed for 40 min using a ball milling technique. The electrolyte paste was coated on a substrate and was pressured with a mold to form a pattern. The patterned electrolyte paste was illuminated by an ultraviolet light to form solid polymeric composite electrolyte having a thickness of about 150 μm Comparative Example 1

Except for the absence of $Al_2O_3$ inorganic particles, a solid polymeric electrolyte of the comparative example 1 was formed using the same process as that used for the experimental example 1.

Performance Evaluation of Solid Polymeric Electrolyte

External appearance of the patterned electrolyte paste was inspected, before the photopolymerization. The electrolyte paste of the comparative example 1 was in liquid state and fell down as soon as it was coated. The electrolyte paste of the experimental example 1 did not fall down and remain the patterned shape. That is, the electrolyte paste of the experimental example 1 had a property suitable for a printing process, while the electrolyte paste of the comparative example 1 had a property unsuitable for the printing process.

Figure 5A:
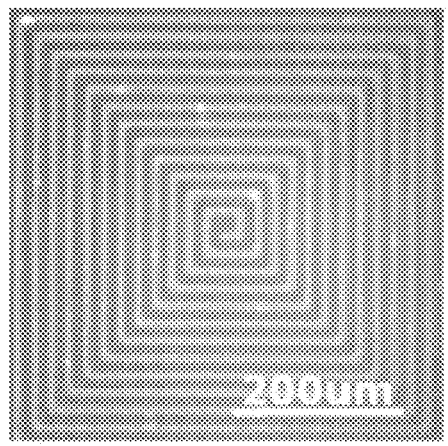
FIG. 5A is an optical microscope image of a sample according to an experimental example 1.
Figure 5B:
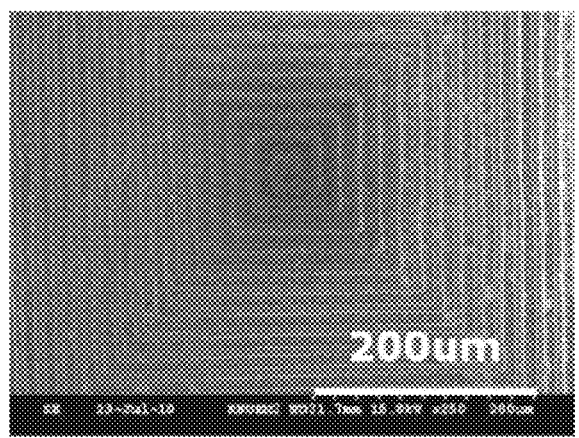
FIGS. 5B and 5C are scanning electron microscope (SEM) images showing top and sectional views of the sample of the experimental example 1.
Figure 5C:
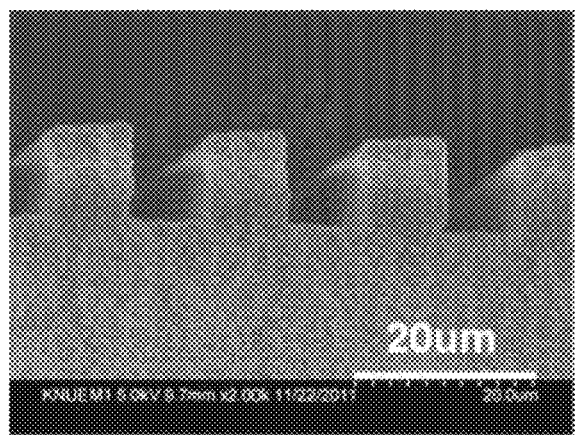

FIG. 5A is an optical microscope image of a sample of the experimental example 1, taken before the photopolymerization. FIGS. 5B and 5C are scanning electron microscope (SEM) images showing top and sectional views of the sample of the experimental example 1, taken after the photopolymerization.

Referring to FIG. 5A through 5C, the pattern of the mold was exactly copied onto the polymer paste, and the copied pattern on the solid polymeric electrolyte was maintained even after the photopolymerization. This result shows that the electrolyte paste of the experimental example 1 had viscosity suitable for a printing process.

Figure 6A:
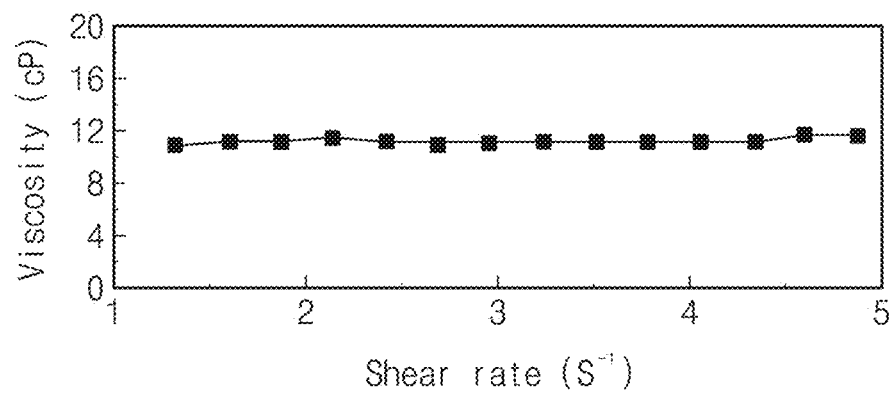
FIGS. 6A and 6B are graphs showing dependence of viscosity on a shear rate of samples according to the comparative example 1 and the experimental example 1, respectively.
Figure 6B:
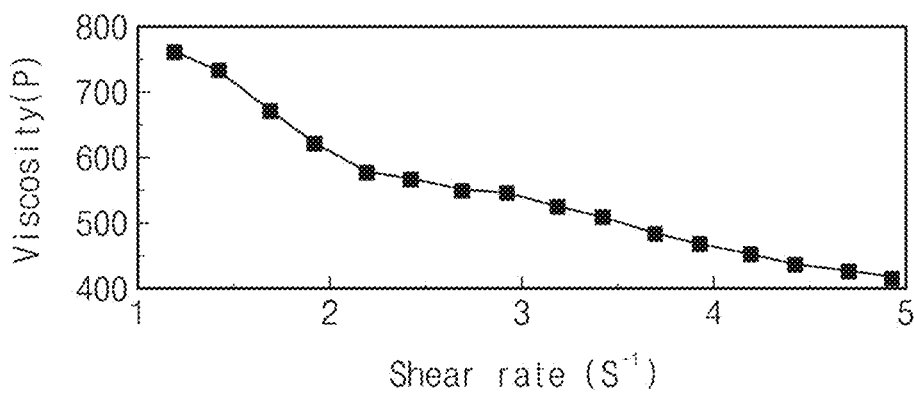

FIGS. 6A and 6B are graphs showing dependence of viscosity on a shear rate of samples according to the comparative example 1 and the experimental example 1, respectively. The curves of viscosity were measured before the photopolymerization.

Referring to FIGS. 6A and 6B, the presence or absence of the inorganic particles caused a change in physical property of the electrolyte paste. For example, viscosity of the electrolyte paste was higher in the experimental example 1 than in the comparative example 1. For the comparative example 1, viscosity of the electrolyte paste was uniform regardless of an increase of the shear-rate. This shows that the electrolyte paste according to the comparative example 1 behaves as a Newtonian fluid, in which a shear stress is proportional to a shear rate. That is, for the Newtonian fluid, viscosity to be caused by a shear rate is uniform. By contrast, the electrolyte paste according to the experimental example 1 exhibited a behavior of non-Newtonian fluid or a shear-thinning fluid. This means that there is a difference in viscosity between the electrolyte pastes according to the experimental example 1 and the comparative example 1. This is the reason that the electrolyte paste according to the experimental example 1 had viscosity suitable for the printing process.

Figure 7:
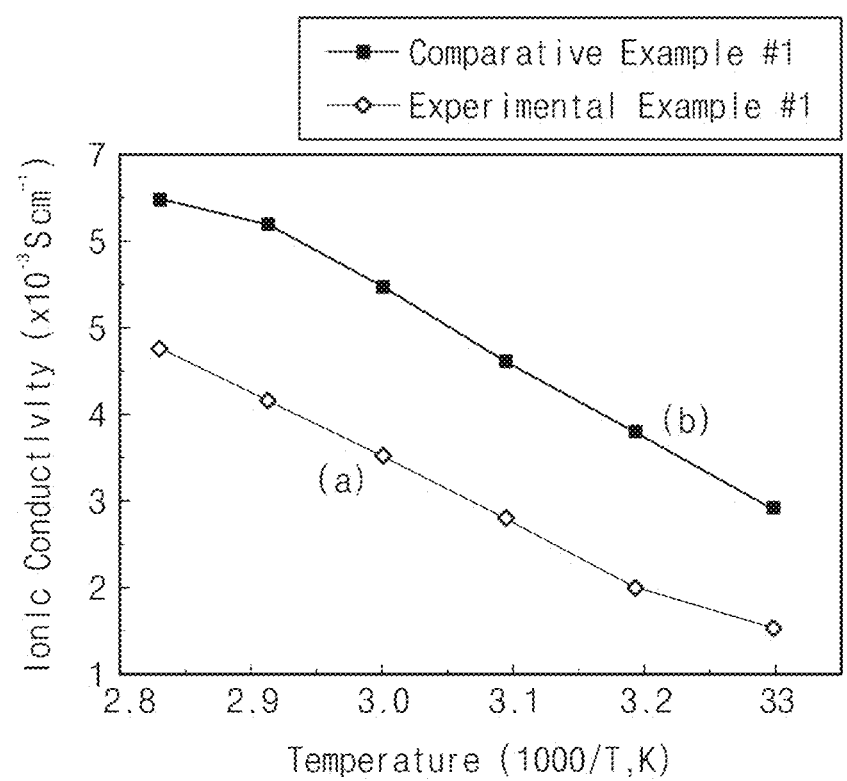
FIG. 7 is a graph showing temperature dependence of ionic conductivity according to the experimental example 1.

FIG. 7 is a graph showing temperature dependence of ionic conductivity according to the experimental example 1.

Referring to FIG. 7, ionic conductivity (a) of the experimental example 1 was lower than that (b) of the comparative example 1. Generally, electrolyte contained with inorganic ions exhibits low ionic conductivity. The ionic conductivity (a) of the experimental example 1 was about $1.4 \times 10^{-3}$ S/cm at room temperature of 300K. The ionic conductivity (a) of the experimental example 1 was higher than $10^{-3}$ S/cm required for a solid polymeric electrolyte. This shows that the experimental example 1 exhibits ionic conductivity suitable for a lithium battery, as the result of optimizing its composition ratio.

Figure 8:
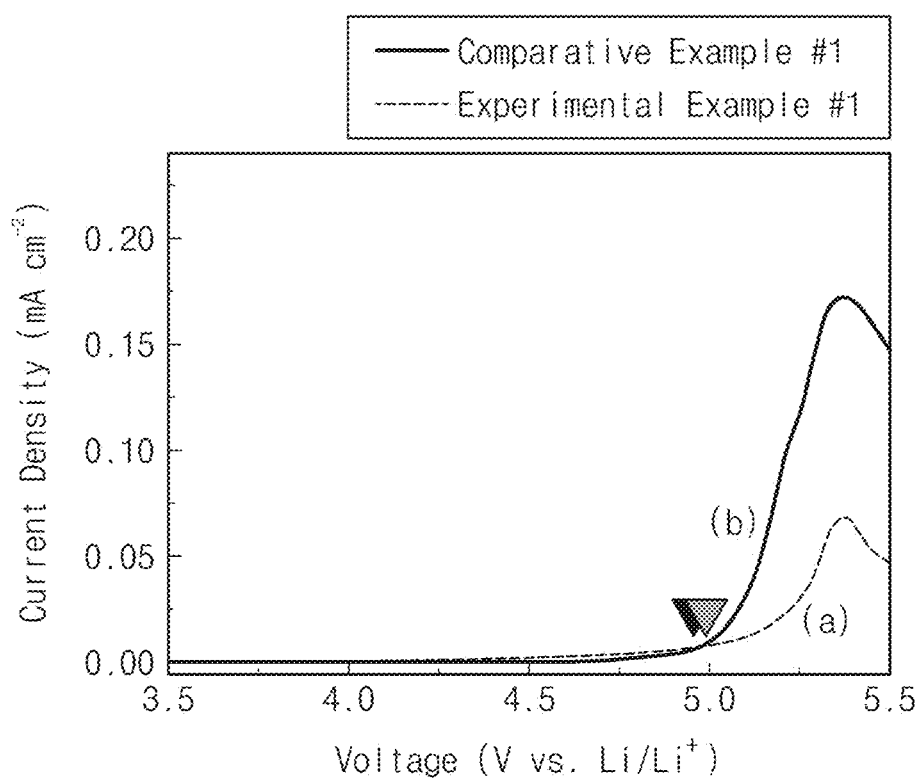
FIG. 8 is a graph showing voltage dependence of electric current density, according to the comparative example 1 and the experimental example 1.

FIG. 8 is a graph showing voltage dependence of electric current density, according to the comparative example 1 and the experimental example 1.

Referring to FIG. 8, for the experimental example 1 (a) and the comparative example 1 (b), an electric current densities were rapidly increased near about 5.0V. If the solid polymeric electrolyte is applied with a voltage higher than a specific voltage, the solid polymeric electrolyte starts to be oxidized and an electric current density measured from the solid polymeric electrolyte may be increased. In this sense, it can be said that there is no difference in oxidation stability between the comparative example 1 and experimental example 1.

Figure 9A:
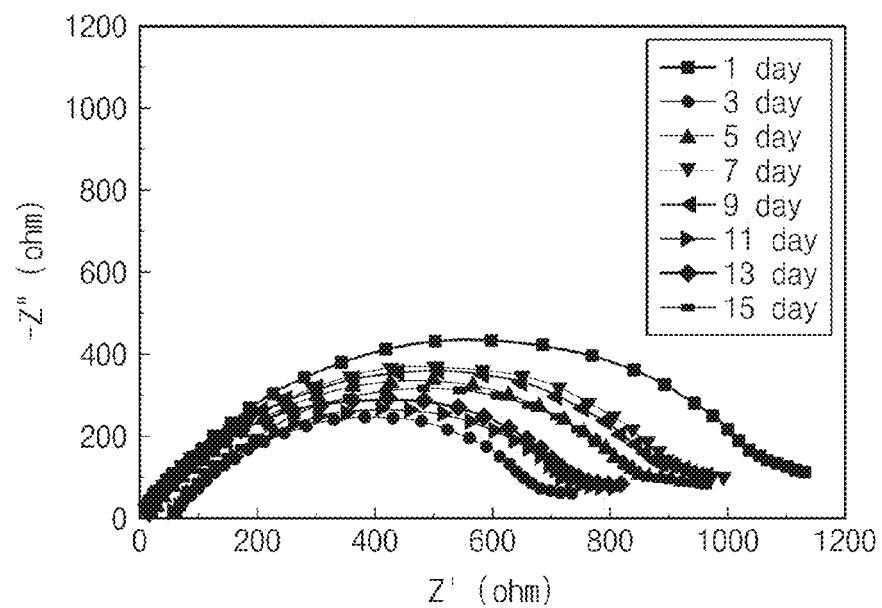
FIGS. 9A through 9C are impedance graphs obtained from samples according to the experimental example 1 and the comparative example 1.
Figure 9B:
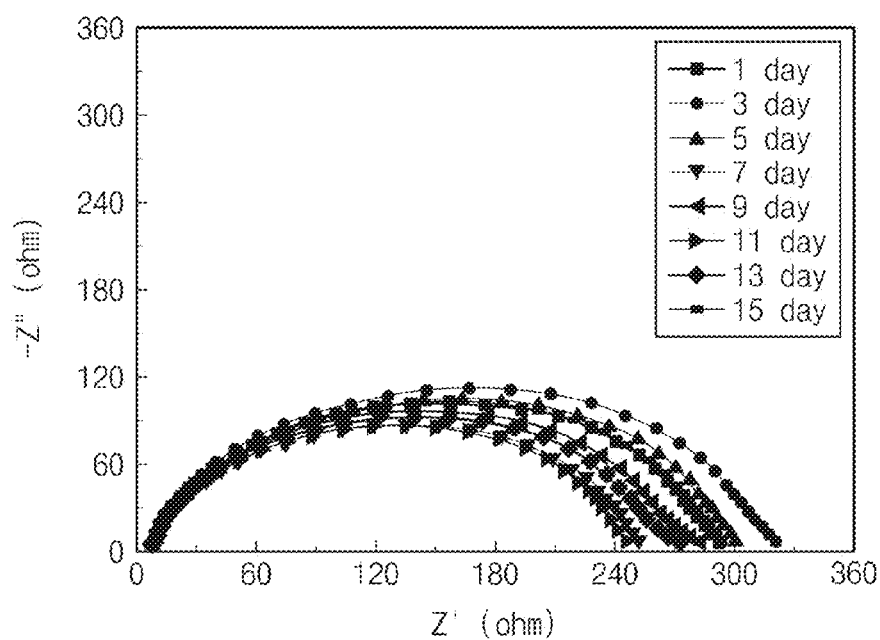
Figure 9C:
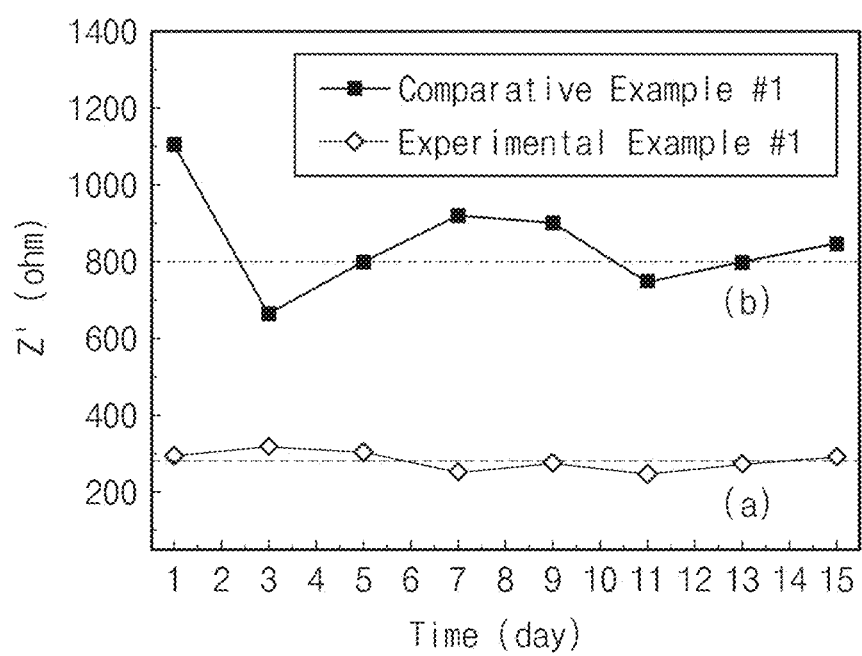

FIGS. 9A through 9C are impedance graphs obtained from samples according to the experimental example 1 and the comparative example 1. FIG. 9C is a graph showing the behavior of impedance over time, according to the experimental example 1 and the comparative example 1.

Referring to FIGS. 9A through 9c, impedance was smaller in the experimental example 1 (a) than in the comparative example 1 (b). Here, the impedance is strongly dependent on interfacial resistance between an electrode and an electrolyte. In this sense, it can be said that, due to the addition of $Al_2O_3$ inorganic particles, the sample of the experimental example 1 had improvement in a property of affinity between the electrolyte and liquid electrolyte and in interfacial stability between the electrode and the electrolyte.

Hereinafter, a lithium battery provided with the solid polymeric electrolyte and its characteristics will be described with reference to experimental examples of the inventive concept.

Fabrication of Lithium Secondary Battery

Experimental Example 2

Cathode Formation

A cathode active material was formed by adding 95 wt % lithium-cobalt mixed oxide ($LiCoO_2$) as a lithium adsorption material, 2 wt % carbon black as a conductive material, 3 wt % polyvinylidene fluoride (PVDF) as a binder, into a solvent of N-methyl-2-pyrrolidone (NMP). The cathode active material was coated on a cathode current collector made of 20 μm aluminum foil. The cathode current collector coated with the cathode active material was dried to form the cathode. Thereafter, a roll press process was performed to the cathode.

[Anode Formation]

The anode was made of lithium metal.

[Battery Formation]

The anode, the cathode, and the solid polymeric electrolyte of the experimental example 1 were assembled to form a coin cell. The anode and the cathode were disposed to face apart from each other, and the solid polymeric electrolyte was interposed between the anode and the cathode. Any separator was not used.

Comparative Example 2

A coin cell according to the comparative example 2 was fabricated using the same process as that of the experimental example 2, except that the gel polymer electrolyte in the comparative example 1 was used for the polymer electrolyte.

Performance Evaluation of Lithium Battery

Figure 10A:
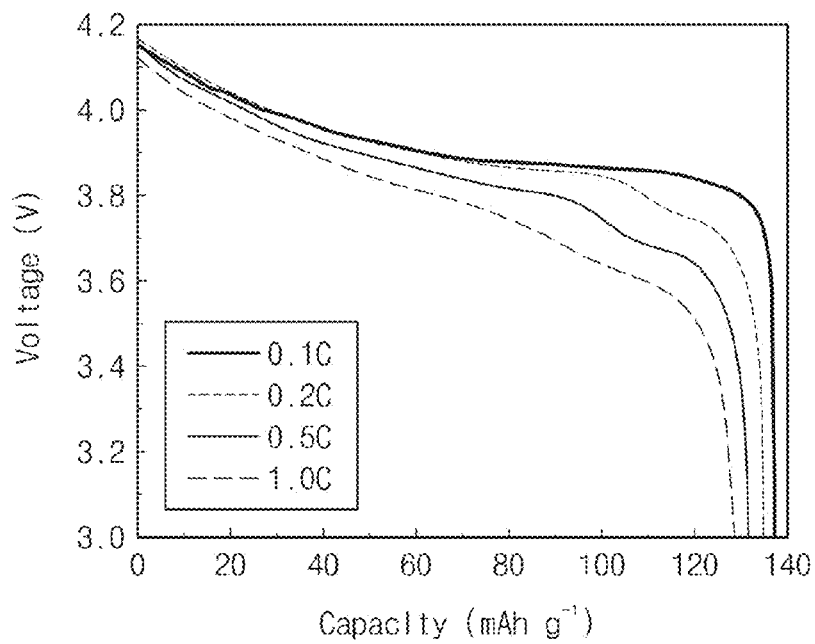
FIG. 10A through 10C are graphs showing high-rate charge and discharge characteristics according to a comparative example 2 and an experimental example 2.
Figure 10B:
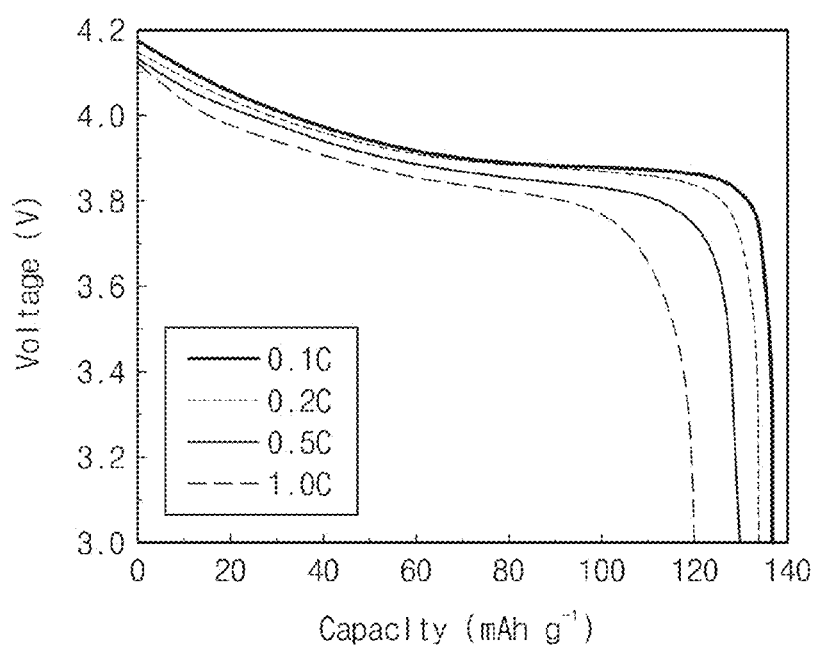
Figure 10C:
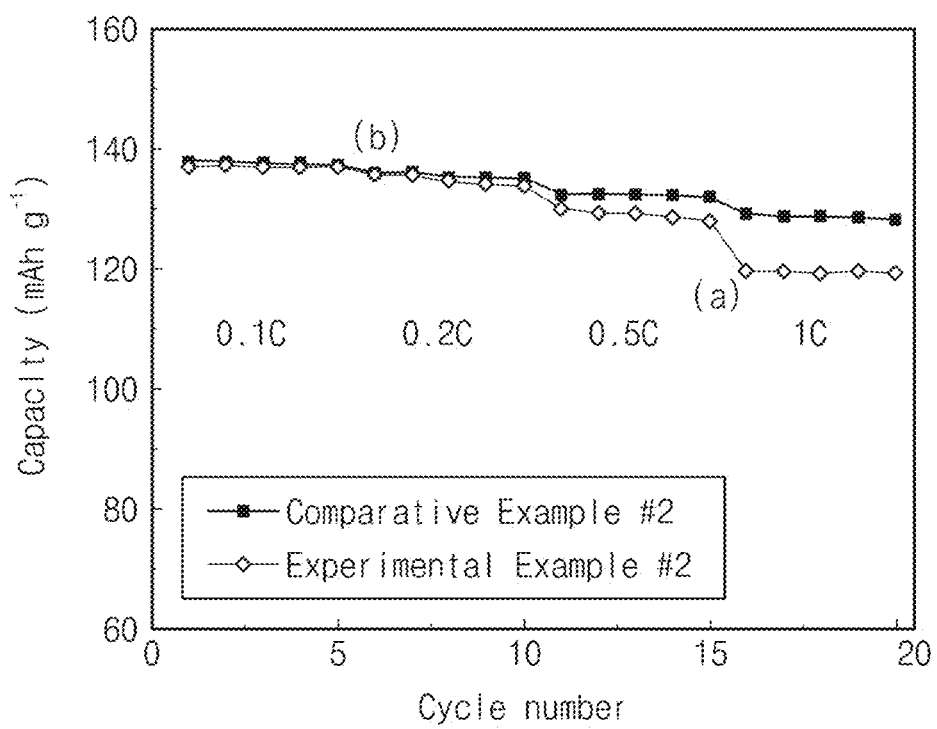

FIGS. 10A and 10B are graphs showing high-rate charge and discharge characteristics according to the comparative example 2 and the experimental example 2, respectively. FIG. 10C is a graph showing capacity over time, according to the experimental example 2 and the comparative example 2. The experiment was performed using a charge-and-discharge method including steps of charging samples with a constant voltage of 4.2V and discharging the same. The experiment was performed with changing a discharging current rate (C-rate) to 0.1C, 0.2C, 0.5C, and 1C. Referring to FIG. 10C, the experimental example 2 (a) was lower than the comparative example 2 (b) in terms of the discharging characteristics.

Figure 11:
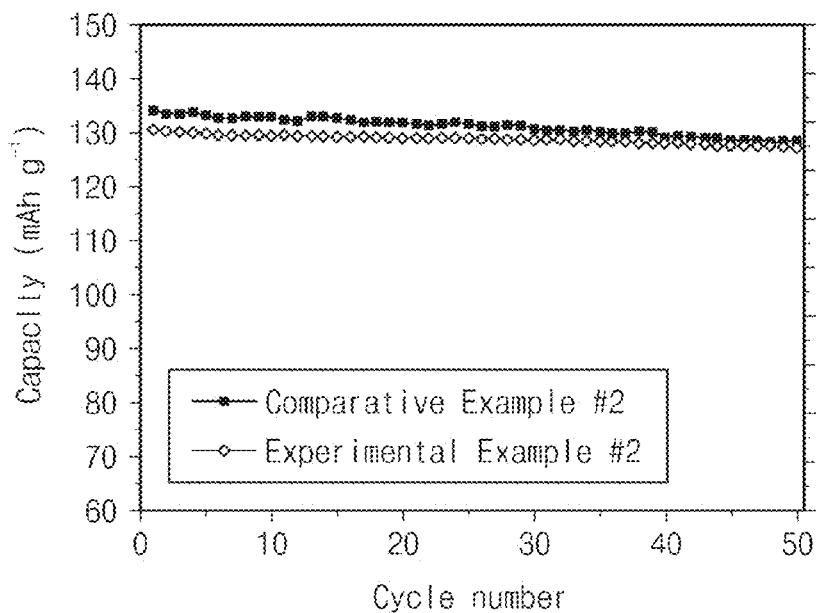
FIG. 11 is a graph showing dependence of capacity on the number of the charging and discharging cycle, according to the experimental example 2 and the comparative example 2.

FIG. 11 is a graph showing dependence of capacity on the number of the charging and discharging cycle, according to the experimental example 2 and the comparative example 2. Referring to FIG. 11, the capacity of the experimental example 2 was weakly dependent on the number of the charging and discharging cycle, compared to the comparative example 2. This means that the experimental example 2 had a cycle property superior to the comparative example 2.

Figure 12:
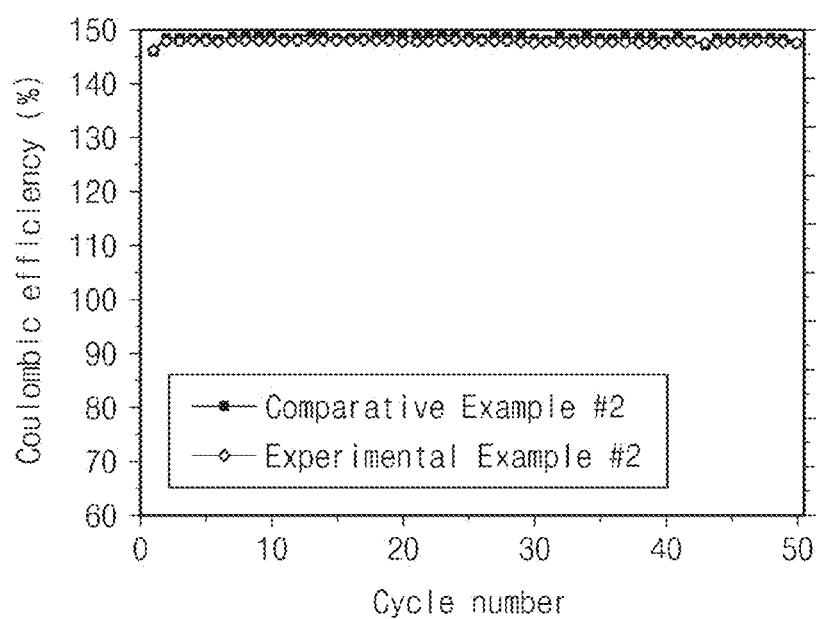
FIG. 12 is a graph showing dependence of capacity efficiency on the number of the charging and discharging cycle, according to the experimental example 2 and the comparative example 2.

FIG. 12 is a graph showing dependence of capacity efficiency on the number of the charging and discharging cycle, according to the experimental example 2 and the comparative example 2. Referring to FIG. 12, there was no difference in capacity efficiency between the experimental example 2 and the comparative example 2. For all that, a variation in capacity efficiency was smaller in the experimental example 2 than in the comparative example 2.

Figure 13A:
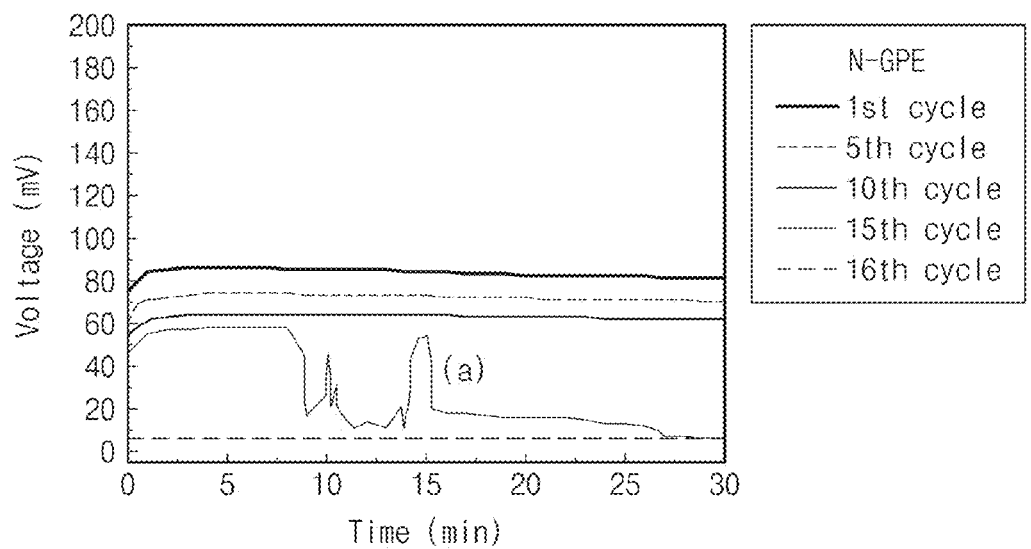
FIGS. 13A and 13B are graphs showing dependence of voltage on the number of the charging and discharging cycle, according to the experimental example 2 and the comparative example 2, respectively.
Figure 13B:
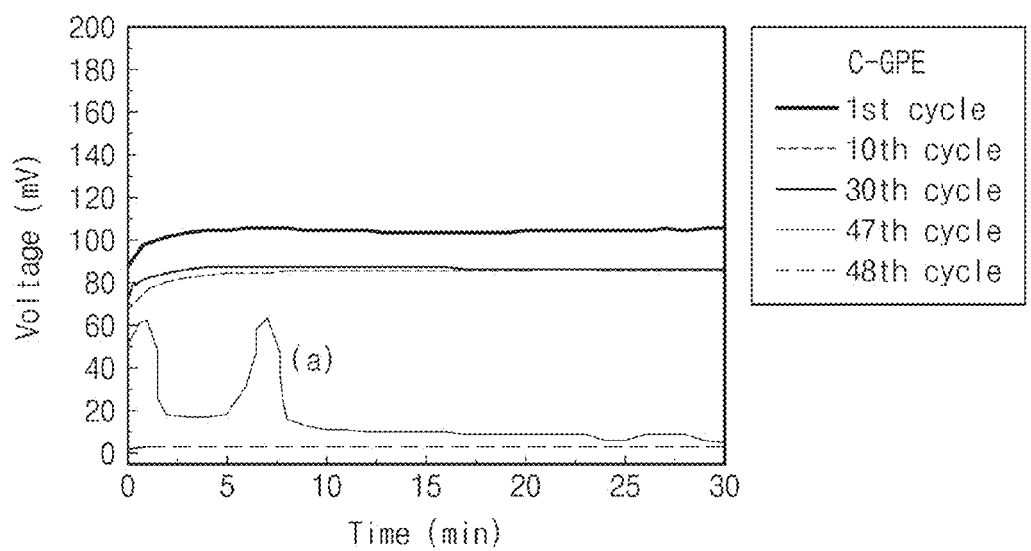

FIGS. 13A and 13B are graphs showing dependence of voltage on the number of the charging and discharging cycle, according to the experimental example 2 and the comparative example 2, respectively. In every cycle, a voltage of the coin cell was measured under the condition of electric current of 0.25 mA cm$^{-2}$. Each cycle was performed in 30 minutes.

Referring to FIGS. 13A and 13B, as depicted by the reference letter (a), for the comparative example 2, an internal short circuit was formed after a fifteenth cycle was performed. By contrast, for the experimental example 2, the internal short circuit was formed after a forty-seventh cycle was performed. That is, the experimental example 2 showed superiority in preventing an internal short, compared with the comparative example 2. Lithium dendrite may be grown from a surface of the cathode during an operation of charging and discharging the lithium battery, and this may result in the internal short-circuits. In the case where $Al_2O_3$ inorganic particles are included in the solid polymeric electrolyte, the graphs of FIGS. 13A and 13B shows that the lithium dendrite of the lithium battery can be prevented from being grown.

Referring to FIGS. 7 through 13B, the experimental example 2 showed slight inferiority in the discharging property but superiority in the cycle property, compared with the comparative example 2. If the solid polymeric electrolyte contains an inorganic particle, ionic conductivity decreases in general. According to the experimental example 2, inorganic particles of $Al_2O_3$ were contained in the solid polymeric electrolyte. For all that, by controlling a composition ratio, dispersion, and a thickness in the process of fabricating the electrolyte paste, deterioration in the discharging property can be suppressed, as described with reference to the experimental example 2. Despite the use of the solid polymeric electrolyte, the electrolyte and the electrode of the experimental example 2 had low interface resistance. In addition, due to the presence of $Al_2O_3$, the experimental example 2 showed improvement in the cycle performance. In other words, according to exemplary embodiments of the inventive concept, the lithium battery can be fabricated to suppress the discharging property from being deteriorated and improve the cycle performance.

In certain embodiments, the solid polymeric electrolyte may be shaped like a patterned polyhedron. The patterned solid polymeric electrolyte may be formed using a printing process. Physical properties of the electrolyte paste may be controlled to be suitable for the printing process. For example, the physical properties of the electrolyte paste may be adjusted by controlling composition ratio, dispersion, and thickness of the electrolyte paste. A shape of the solid polymeric electrolyte may be variously modified by, for example, using the printing process. The lithium battery provided with the solid polymeric electrolyte can exhibit improved performance, regardless of the shape of the solid polymeric electrolyte. For example, the lithium battery may exhibit improvement in interface stability between the electrode and the electrolyte and be configured to suppress an internal short therein. The patterned solid polymeric electrolyte may have an increased surface area, due to the presence of the pattern. In addition, the lithium battery provided with the solid polymeric electrolyte can be configured to realize various designs.

According to exemplary embodiments of the inventive concept, a structure or shape of the solid polymeric electrolyte may be selectively changed. In other words, the solid polymeric electrolyte may be patterned. The solid polymeric electrolyte may be fabricated from an electrolyte paste including a liquid electrolyte, a photo-crosslinking agent, and inorganic particles by, for example, a printing process. The electrolyte paste may be formed by controlling composition ratio, dispersion, and thickness of the electrolyte paste to have physical properties suitable for the printing process. The solid polymeric electrolyte can exhibit improved performance, regardless of its shape. Accordingly, it is possible to diversify design of the lithium battery provided with the solid polymeric electrolyte.

While exemplary embodiments of the inventive concepts have been particularly shown and described, it will be understood by one of ordinary skill in the art that variations in form and detail may be made therein without departing from the spirit and scope of the attached claims.

What is claimed is:

1. A solid polymeric electrolyte having a pattern that has a structure that is one of a polyhedron structure, a hexahedral structure, an elliptical structure, a spherical structure, a conical structure, and a polygonal structure, the solid polymeric electrolyte comprising:
   a polymer matrix having a mesh structure, the polymer matrix being formed of a cured photo-crosslinking agent that includes at least one of polyethyleneglycol diacrylate, triethyleneglycol diacrylate, trimethylolpropaneethoxylate triacrylate, and Bisphenol A ethoxylate dimethacrylate;
   inorganic particles substantially uniformly distributed in the polymer matrix; and
   a liquid electrolyte comprised of a lithium salt and an organic solvent impregnated between the polymer matrix and the inorganic particles,
   wherein the liquid electrolyte and the cured photo-crosslinking agent are present in a weight ratio ranging from 50:50 to 99:1, wherein the liquid electrolyte containing the cured photo-crosslinking agent and the inorganic particles are present in a weight ratio ranging from 10:90 to 90:10, and wherein the solid polymeric electrolyte has properties suitable for a printing process to provide said pattern including a thickness ranging from about 10 nm to about 500 μm and, prior to curing the photo-crosslinking agent, a viscosity ranging from 100-10,000 poise under a shear rate condition of 1 $\sec^{-1}$.

2. The solid polymeric electrolyte of claim 1, wherein the inorganic particles include at least one of silicon dioxide ($SiO_2$), aluminum oxide ($Al_2O_3$), titanium dioxide ($TiO_2$), titanium barium oxide ($BaTiO_3$), lithium oxide ($Li_2O$), lithium fluoride (LiF), lithium hydroxide (LiOH), lithium nitride ($Li_3N$), barium oxide (BaO), sodium oxide ($Na_2O$), lithium carbonate ($Li_2CO_3$), calcium carbonate ($CaCO_3$), lithium aluminate ($LiAlO_2$), titanium strontium oxide ($SrTiO_3$), tin oxide ($SnO_2$), cerium oxide ($CeO_2$), magnesium oxide (MgO), nickel oxide (NiO), calcium oxide (CaO), zinc oxide (ZnO), zinc peroxide ($ZrO_2$), and silicon carbide (SiC).

3. The solid polymeric electrolyte of claim 1, wherein a mean diameter of the inorganic particles ranges from about 1 nm to about 10 μm.

4. The solid polymeric electrolyte of claim 1, wherein:

the lithium salt includes at least one of lithium hexafluorophosphate ($LiPF_6$), lithium tetrafluoroborate ($LiBF_4$), lithium hexafluoroantimonate ($LiSbF_6$), lithium hexafluoroarsenate ($LiAsF_6$), lithium difluoromethanesulfonate ($LiC_4F_9SO_3$), lithium perchlorate ($LiClO_4$), lithium aluminate ($LiAlO_2$), lithium tetrachloroaluminate ($LiAlCl_4$), lithium chloride (LiCl), lithium iodide (LiI), lithium bis(oxalato)borate ($LiB(C_2O_4)_2$), and lithium trifluoromethanesulfonyl imide ($LiN(C_xF_{2x+1}SO_2)(C_yF_{2y+1}SO_2)$) (where x and y are natural numbers), and the organic solvent includes at least one of ethylene carbonate, propylene carbonate, g-butylrolactone, and ethylene glycol dimethyl ether.

5. A lithium battery, comprising:

an anode electrode provided with an anode active material and an anode current collector;

a cathode electrode provided with a cathode active material and a cathode current collector and disposed to face the anode electrode; and a solid polymeric electrolyte having a pattern according to claim 1 and being interposed between the anode and cathode electrodes.

6. The lithium battery of claim 5, wherein:

the lithium salt includes at least one of lithium hexafluorophosphate ($LiPF_6$), lithium tetrafluoroborate ($LiBF_4$), lithium hexafluoroantimonate ($LiSbF_6$), lithium hexafluoroarsenate ($LiAsF_6$), lithium difluoromethanesulfonate ($LiC_4F_9SO_3$), lithium perchlorate ($LiClO_4$), lithium aluminate ($LiAlO_2$), lithium tetrachloroaluminate ($LiAlCl_4$), lithium chloride (LiCl), lithium iodide (LiI), lithium bis(oxalato)borate ($LiB(C_2O_4)_2$), and lithium trifluoromethanesulfonyl imide ($LiN(C_xF_{2x+1}SO_2)(C_yF_{2y+1}SO_2)$) (where x and y are natural numbers), and the organic solvent includes at least one of ethylene carbonate, propylene carbonate, g-butylrolactone, and ethylene glycol dimethyl ether.

7. The lithium battery of claim 5, wherein the photo-crosslinking agent includes at least one of polyethyleneglycol diacrylate, triethyleneglycol diacrylate, trimethylolpropaneethoxylate triacrylate, and Bisphenol A ethoxylate dimethacrylate.

8. The lithium battery of claim 5, wherein the inorganic particles include at least one of silicon dioxide ($SiO_2$), aluminum oxide ($Al_2O_3$), titanium dioxide ($TiO_2$), titanium barium oxide ($BaTiO_3$), lithium oxide ($Li_2O$), lithium fluoride (LiF), lithium hydroxide (LiOH), lithium nitride ($Li_3N$), barium oxide (BaO), sodium oxide ($Na_2O$), lithium carbonate ($Li_2CO_3$), calcium carbonate ($CaCO_3$), lithium aluminate ($LiAlO_2$), titanium strontium oxide ($SrTiO_3$), tin oxide ($SnO_2$), cerium oxide ($CeO_2$), magnesium oxide (MgO), nickel oxide (NiO), calcium oxide (CaO), zinc oxide (ZnO), zinc peroxide ($ZrO_2$), and silicon carbide (SiC).

9. The lithium battery of claim 5, wherein a mean diameter of the inorganic particles ranges from about 1 nm to about 10 μm.

* * * * *